Patented Jan. 13, 1948

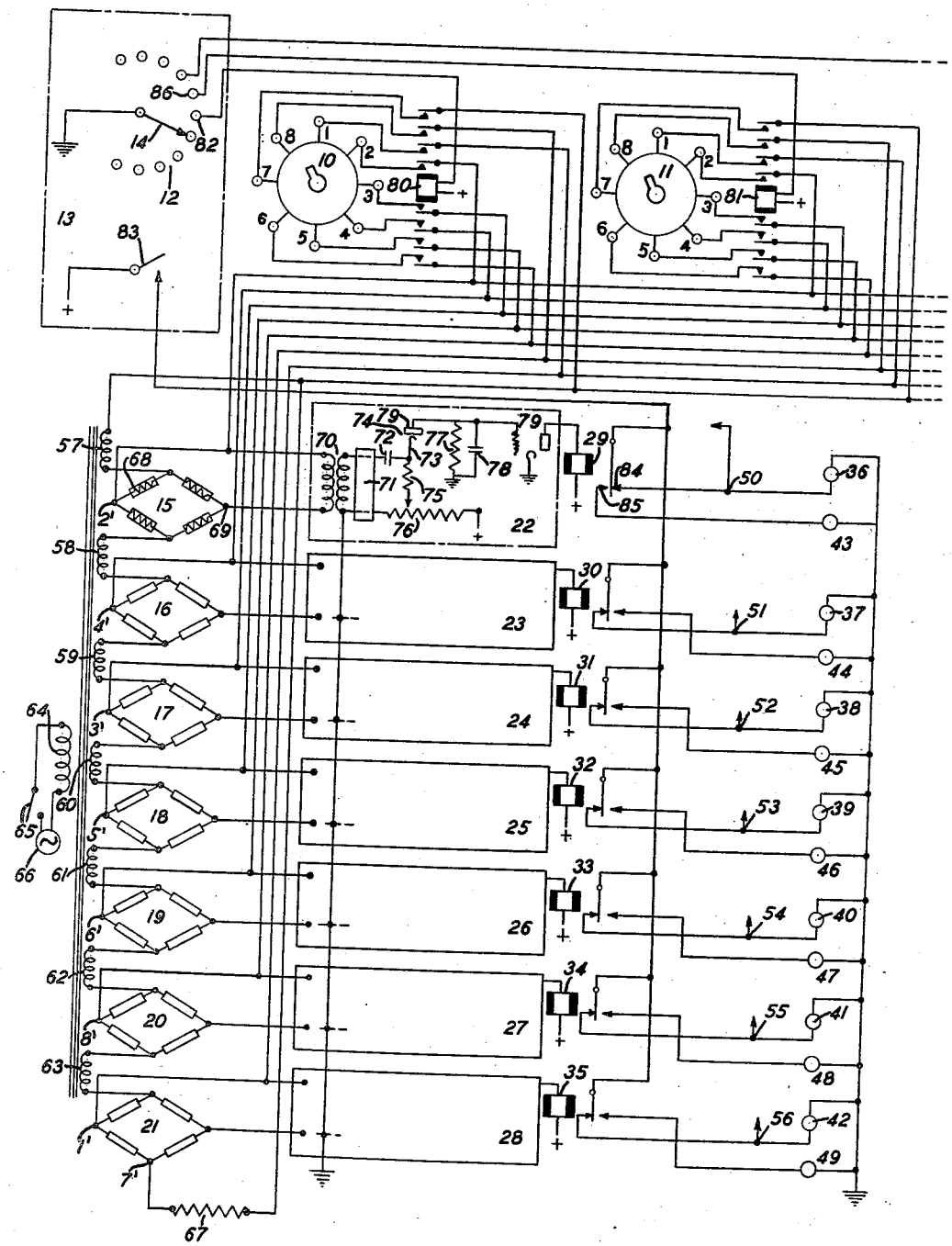

2,434,336

UNITED STATES PATENT OFFICE 2,434,336

CONTINUITY AND SHORT-CIRCUIT TEST SET

Harry N. Snook, Maywood, N. J., assignor to Western Electric Company, Incorporated, New York, N. Y., a corporation of New York Application May 15, 1946, Serial No. 669,821

7 Claims. (Cl. 315—365)

1

This invention relates to testing and particularly to testing for continuity or short circuits in electrical networks or apparatus such as vacuum tubes.

In the production testing of electrical apparatus it is often necessary to make a large number of tests which if performed individually by ordinary manual methods would be a very laborious and time-consuming procedure. It is therefore common practice in such cases to provide test sets which in operation are as nearly automatic as possible. However, when it is attempted to apply this technique to the rapid testing of multielectrode vacuum tubes for filament continuity and short circuits, or abnormally low resistance between any two electrodes, it is found that with the testing apparatus available heretofore, the sensitivity in detecting trouble varies widely depending on the location of the fault within the electrical network under test.

The object of this invention is apparatus for the rapid testing of a plurality of electrical components in rapid sequence and with a substantially uniformly high degree of sensitivity in the detection of a fault, regardless of its location within the apparatus.

According to the general features of the invention, a plurality of similar Wheatstone bridges have corresponding first pairs of conjugate terminals connected in series with a source of potential to form a closed loop. One terminal of the other conjugate pair of each bridge is connected to one of the test points between which short circuits are to be detected, and each other test point to which a continuity test is to be made is connected to the series loop adjacent the bridge to which the corresponding continuity test point is connected. The second pair of conjugate terminals of each bridge is associated with a suitable unbalance detector and an indicating or alarm device.

All the terminals of the vacuum tube or other apparatus to be tested are connected simultaneously to the test points, and in the event of an abnormal condition existing between any two terminals, the corresponding indicating or alarm devices are energized. Many tubes or other pieces of apparatus may be tested in rapid succession by connecting them in sequence to the test points under the control of stepping mechanism.

In accordance with an important feature of the invention an energizing potential is introduced into the loop between each pair of bridges to compensate for the potential drop through the adjacent bridge, thereby giving the testing apparatus substantially the same sensitivity in the detection of an abnormal condition any where in the loop.

These and other features will be more clearly understood from the following detailed description and the single figure of the drawing showing a testing system according to the invention as applied to the testing of vacuum tubes.

In the drawing the sockets 10 and 11 for vacuum tubes to be tested are typical of any desired number required for testing a plurality of tubes in sequence by successive operations of the selector switch 12 in the stepping mechanism 13. In practice, this mechanism may be automatic in operation to rotate the arm 14 to connect the next device for test as soon as the tests on the preceding device have been satisfactorily completed. However, this automatic mechanism forms no part of this invention and, to simplify the disclosure, the devices to be tested are shown as being selected by the manual operation of the switch 14.

For vacuum tubes such as those shown, having a maximum of eight terminals, there are provided seven substantially identical test channels, each comprising one of the resistance bridges 15 to 21, one of the amplifier-detectors 22 to 28, one of the relays 29 to 35 and one each of the "OK" lamps 36 to 42 and the "reject" lamps 43 to 49. It will be understood that these indicating lamps are merely illustrative and that in practice the relays may control other known types of indicators and alarm signals, and also may complete circuits for controlling the stepping mechanism 13. Such circuits may be connected to the points 50 to 56.

The bridges 15 to 21 each have vertical and horizontal pairs of conjugate terminals and they are connected to form a closed series loop by means of identical windings 57 to 63, each of which is interposed between the vertical terminals of two adjacent bridges. These windings are preferably all secondary coils of a single transformer, having its primary winding 64 connected through a switch 65 to a source 66 of alternating current. When the source voltage is of the order of 110 v., the transformation ratio may be unity, and in a typical case, the upper bridge resistors are each 51,000 ohms, the lower resistors are each 10,000 ohms, and the loop is provided with a current limiting resistor 67 of about 2 megohms. In the amplifier-detectors such as 22, the horizontal terminals 2' and 69 of the bridge 15 are connected through an input transformer 70, a conventional amplifier 71, and a condenser 72 to the cathode 73 of the diode 74. The cathode normally is maintained at positive potential due to its connection through resistor 75 to a suitable point along a resistor 76, extending from a source of positive potential to ground as indicated.

The diode is shunted by the usual load resistor 77 and condenser 78 which form a network having the proper time constant so that the condenser holds a substantial part of its charge during the half cycles in which the diode is not conducting. Potentials appearing across the condenser are impressed as a negative bias on the tube 79 to control the current through the relay 29. When the bridge is balanced; that is, for example, when there is no potential difference between the horizontal terminals of the bridge 15, the amplifier 71 produces no potential across the resistor 75 and the diode 74 is biased to cut-off by positive cathode potential derived from the resistor 76. The grid of the tube 79 is therefore at ground potential, the tube is conducting and its plate current holds the relay 29 operated. This is the normal condition for the bridges 16 to 21 and hence relays 30 to 35 are shown in operated position but, for reasons to be explained, the bridge 15 is normally unbalanced by an external low impedance and on alternate half cycles the potential between points 2' and 69 produces the potential across resistor 75 which unblocks the diode 74. The resulting current through the diode charges the condenser 78 to produce a high negative bias on the grid of the tube 79 and block this tube, thereby releasing the relay 29 as shown.

The terminals of the vacuum tube sockets 10 and 11 are numbered 1 to 8 in the usual manner and, by the operation of the corresponding relay 80 or 81, all the terminals of any socket may be connected simultaneously to the bridge loop at the points indicated by the corresponding primed numbers. In operation, the tubes to be tested are placed in the sockets 10, 11, etc., the switch 35 is closed to energize the bridge loop and the selector switch 14 is moved to contact 82 to operate the relay 80 and connect the electrodes of the associated tube to the loop.

If the filament (terminals 2 and 7) is unbroken, it becomes a very low impedance shunt across the transformer winding 57 and the resistor 68 thereby unbalancing the bridge 15, unblocking the diode 74 and biasing the tube 79 to cut-off so that relay 29 is released as shown. A short time after the operation of the selector switch 14, the key 83 is closed to complete a circuit from the positive terminal of a source of potential through the key, the back contact 84 of relay 29 and the "OK" lamp 36 to ground to light the lamp and indicate the continuity of the filament. However, if the filament circuit is open and there are no short circuits involving terminals 2 or 7, the bridge 15 will be balanced, the relay 29 will be operated, and the "reject" lamp 43 will be lighted over the circuit extending through the front contact 85.

Similarly, if no short circuits or abnormally low impedance conditions exist between any pair of electrodes other than 2 and 7, all the other bridges will be balanced, relays 30 and 35 will all be operated as shown, and all of the "OK" lamps 37 to 42 will light when the key 83 is closed. On the other hand, a short circuit or a low impedance condition between any two electrodes other than 2 and 7 will unbalance a pair of bridges and release the corresponding relays to light the associated "reject" lamps to indicate the location of the fault within the tube.

If, for example, trouble exists between electrodes 3 and 4, thereby establishing a low impedance path between points 3' and 4' only, the bridges 16 and 17 will be unbalanced and relays 30 and 31 will release to light the "reject" lamps 44 and 45. The minimum and maximum impedances for short circuit and continuity tests, respectively, may be readily controlled by adjusting the biases on the diodes 74, and the sensitivity of the various channels may be equalized at any desired value by adjusting the gains of the amplifiers 71.

It will be noted that the "reject" lamp 43 will light on either an open filament or when there is a short circuit between terminal 2 and any other terminal except 7. However, in the case of an open filament, only lamp 43 lights whereas for a short circuit the "reject" lamp associated with the other terminal involved also will light, thereby discriminating between the two faults. For example, a short circuit between terminals 2 and 8 will light lamp 48 as well as lamp 43.

As soon as the lamps have indicated the condition of one tube, the key 83 may be released, the selector switch 14 stepped to the contact 86, and the key 83 reclosed to test the tube in the socket 11. It is necessary to delay closing the key for a short interval after each stepping operation of the selector switch in order to insure that the relays 29 to 35 shall have time to assume their respective positions according to the condition of the tube then under test. With the manually operated selector switch shown, a series of tubes may be tested and individually marked as to their condition as the test progresses. If desired, the connections from the points 50 to 56 may extend to the stepping mechanism 13 and control the stepping circuits in such a manner as to prevent further operation of the selector switch until a defective tube has been replaced by one found free from faults. With such an automatic system control, the test circuits shown have been used to check apparatus involving a large number of tubes at the rate of less than one second per tube.

While the invention has been described for purposes of illustration as applied to the testing of vacuum tubes, it will be understood that the circuit shown may be modified according to the general teachings of the invention to apply to the testing of other types of apparatus or circuits involving any number of test points and various combination of short circuit and continuity tests required in a particular case. If, for example, the amplifier-detector 22 is to test for a short circuit instead of for continuity, relay 29 may be wired in the same manner as the other relays. Conversely, if all channels are to be used for continuity tests, relays 30 to 35 may be wired in the same manner as relay 29.

What is claimed is:

1. In a test set a plurality of Wheatstone bridges each having two pairs of conjugate terminals, means including a source of potential connecting one pair of terminals of all the bridges in a closed series loop, a plurality of test points between which tests are to be made, connections between the test points and one of the other pair of terminals of each bridge, and indicator means for each bridge connected across said other pair of terminals.

2. In a test set a plurality of Wheatstone bridges each having two pairs of conjugate terminals, means including a source of potential for each bridge connecting one pair of terminals of all the bridges in a closed series loop, a plurality of test points between which tests are to be made, means for simultaneously connecting all the test points to the bridges respectively, each point being connected to one of the other pair of terminals, indicating means for each brdige associated with said other pair of terminals, and means for simultaneously energizing all of the indicating means.

3. In a test set the combination with a plurality of Wheatstone bridges each having two pairs of terminals, indicator means associated with one pair of terminals of each bridge, and apparatus having a plurality of test points connected to one of said pair of terminals of the bridges respectively, of means, including a separate source of potential for each bridge, connecting the other pairs of bridge terminals in a closed series loop.

4. In a test set the combination with a plurality of Wheatstone bridges each having two pairs of terminals, indicator means associated with one pair of terminals of each bridge, and apparatus having a plurality of test points connected to one of said pair of terminals of the bridges respectively, of means for connecting the other pair of bridge terminals in a closed series loop including a transformer having a plurality of similar secondary windings with one of the windings serially connected in the loop between each pair of bridges.

5. In a test set a plurality of Wheatstone bridges each having two pairs of conjugate terminals, means including a source of potential connecting one pair of terminals of all the bridges in a closed series loop, a plurality of receptacles for apparatus to be tested each having points between which tests are to be made, relays for selectively connecting the receptacles to the bridges with one test point connected to one of the other pair of terminals of each bridge, a separate test channel for each bridge comprising a biased detector responsive to unbalance potential in the bridge, a relay controlled by the output of the detector, and indicating devices selectively energized according to the condition of the relay.

6. Apparatus for detecting abnormal conditions between any two of a plurality of electrical terminals, comprising a plurality of test channels each having devices for indicating normal and abnormal conditions within the channel, a plurality of balanced networks serially connected in a closed loop, connections from the networks to the channels, means for connecting the terminals to the loop to unbalance the networks selectively in response to a condition of electrical continuity between any two of the terminals, and means in each channel for energizing the indicating device in accordance with the balanced or unbalanced condition of the network.

7. Apparatus for simultaneously testing vacuum tubes for open filament and for short circuits between any pair of electrodes comprising a normally balanced network for each pair of electrodes, means including a source of potential between each pair of networks, connecting the networks in a closed series loop, a test channel connected to each network and having devices for indicating balanced and unbalanced conditions of the network, and switching means for simultaneously connecting all the terminals to be tested for short circuits, including one of the filament terminals, to corresponding points in the respective networks and connecting the other filament terminal to another point of the network to which the said one filament terminal is connected.

HARRY N. SNOOK.